(12) United States Patent
Hakura et al.

(10) Patent No.: US 8,817,031 B2
(45) Date of Patent: Aug. 26, 2014

(54) DISTRIBUTED STREAM OUTPUT IN A PARALLEL PROCESSING UNIT

(75) Inventors: Ziyad S. Hakura, Gilroy, CA (US); Rohit Gupta, San Jose, CA (US); Michael C. Shebanow, Saratoga, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 830 days.

(21) Appl. No.: 12/894,001

(22) Filed: Sep. 29, 2010
(Under 37 CFR 1.47)

(65) Prior Publication Data
US 2011/0141122 A1 Jun. 16, 2011

Related U.S. Application Data

(60) Provisional application No. 61/248,385, filed on Oct. 2, 2009.

(51) Int. Cl.
G06F 15/80 (2006.01)
(52) U.S. Cl.
USPC ........................................................ 345/505
(58) Field of Classification Search
USPC ........................................................ 345/505
See application file for complete search history.

(56) References Cited

U.S. PATENT DOCUMENTS

| | | | |
|---|---|---|---|
| 6,515,671 B1 * | 2/2003 | Lindholm et al. | 345/506 |
| 7,002,586 B2 * | 2/2006 | Chiu et al. | 345/505 |
| 7,071,935 B1 * | 7/2006 | Deering et al. | 345/419 |
| 7,234,645 B2 * | 6/2007 | Silverbrook et al. | 235/494 |
| 7,400,326 B1 * | 7/2008 | Acocella et al. | 345/520 |
| 7,701,459 B1 * | 4/2010 | Mrazek et al. | 345/505 |
| 8,325,177 B2 * | 12/2012 | Lawrence et al. | 345/418 |
| 2007/0030280 A1 * | 2/2007 | Paltashev et al. | 345/506 |
| 2007/0220525 A1 * | 9/2007 | State et al. | 718/107 |
| 2007/0250688 A1 * | 10/2007 | Kyou | 712/215 |
| 2008/0144952 A1 * | 6/2008 | Chen et al. | 382/239 |
| 2009/0073168 A1 * | 3/2009 | Jiao et al. | 345/426 |
| 2009/0141033 A1 * | 6/2009 | Street | 345/506 |
| 2009/0295804 A1 * | 12/2009 | Goel et al. | 345/426 |
| 2010/0312801 A1 * | 12/2010 | Ostrovsky et al. | 707/803 |

* cited by examiner

*Primary Examiner* — Xiao Wu
*Assistant Examiner* — Hoai Le
(74) *Attorney, Agent, or Firm* — Patterson & Sheridan, LLP

(57) ABSTRACT

A technique for performing stream output operations in a parallel processing system is disclosed. A stream synchronization unit is provided that enables the parallel processing unit to track batches of vertices being processed in a graphics processing pipeline. A plurality of stream output units is also provided, where each stream output unit writes vertex attribute data to one or more stream output buffers for a portion of the batches of vertices. A messaging protocol is implemented between the stream synchronization unit and the plurality of stream output units that ensures that each of the stream output units writes vertex attribute data for the particular batch of vertices distributed to that particular stream output unit in the same order in the stream output buffers as the order in which the batch of vertices was received from a device driver by the parallel processing unit.

20 Claims, 14 Drawing Sheets

DISTRIBUTED STREAM OUTPUT IN A PARALLEL PROCESSING UNIT

CROSS REFERENCE TO RELATED APPLICATIONS

This application claims priority benefit to United States provisional patent application titled, "DISTRIBUTED STREAM OUTPUT" filed on Oct. 2, 2009 and having Ser. No. 61/248,385.

BACKGROUND OF THE INVENTION

1. Field of the Invention

The invention relates generally to parallel data processing and, more specifically, to distributed stream output in a parallel processing unit.

2. Description of the Related Art

General purpose computing on graphics processing units (GPGPU) is a technique used to perform highly parallel processing tasks using a graphics processing unit (GPU) in place of a traditional central processing unit (CPU). Programmable shader programs enable software to configure the GPU to perform highly parallel computing tasks such as physics calculations and financial simulations. The graphics application programming interface (API) includes a mechanism for performing stream output after primitive data or vertex data has been processed by a shader program. Stream output enables the data processed in the GPU to bypass the pixel shader and rasterization units in the graphics pipeline.

Conventional GPUs include a single hardware unit for performing stream output. The stream output unit writes data to one or more stream output buffers located in memory. Conventionally, the stream output buffers are located in the frame buffer stored in a local DRAM memory. The graphics API expects stream output generated by the GPU to be written to the stream output buffers in a serialized fashion, e.g. the first work packet sent to the GPU corresponds to the first stream output data written to the stream output buffers. In addition, the stream output unit bandwidth is typically smaller than the total frame buffer bandwidth in the GPU.

One drawback to the technique of using a single stream output unit is that the stream output unit is unable to saturate the available frame buffer bandwidth. Increasing the bandwidth of the single stream output unit to match the bandwidth of the frame buffer would increase the size and complexity of the layout of the stream output unit on the GPU integrated circuit as well as increasing power consumption. A further drawback to this technique is that in the case where a GPU implements parallel shader programs in a multi-core processor, using a single stream output unit creates a bottleneck in the graphics processing pipeline. In such cases, each shader program is required to wait until all prior issued work packets are written to the stream output buffers by the stream output unit. Therefore, a shader program that is ready to write data to the stream output buffers may sit idle while other shader programs finish processing and write data to the stream output buffers using the stream output unit. This serialized stream output technique reduces the advantages of executing parallel shader programs.

As the foregoing illustrates, what is needed in the art is an improved method for performing stream output by parallel processing units.

SUMMARY OF THE INVENTION

One embodiment of the present invention sets forth a method for controlling distributed stream output operations in a parallel processing unit. The method includes the steps of receiving a request message from a first stream output unit that includes a current batch identification number corresponding to a batch of vertices being processed within the parallel processing unit, and determining whether the current batch identification number is equal to a batch identification number corresponding to a next batch of vertices being processed in the parallel processing unit that is to be written to one or more stream output buffers. If the current batch identification number is equal to the batch identification number, sending a response message that includes one or more stream output buffer offsets, where each stream output buffer offset indicates a location in a different one of the one or more stream output buffers where data is to be written. However, if the current batch identification number is not equal to the batch identification number, waiting for a request message from a different stream output unit.

One advantage of the disclosed method is that the distributed stream output units are able to fully saturate the available frame buffer bandwidth. Multiple, distributed stream output units may write data to the frame buffer during the same clock cycle. Therefore, even though each individual stream output unit may have a narrow bandwidth, the total stream output bandwidth is scalable to match the available frame buffer bandwidth. A further advantage of the disclosed method is that each stream output unit may write data to the frame buffer in parallel without waiting for the frame buffer to be filled by all prior issued work bundles. Therefore, the bottleneck created when using a single stream output unit for multiple, parallel shader programs is reduced.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
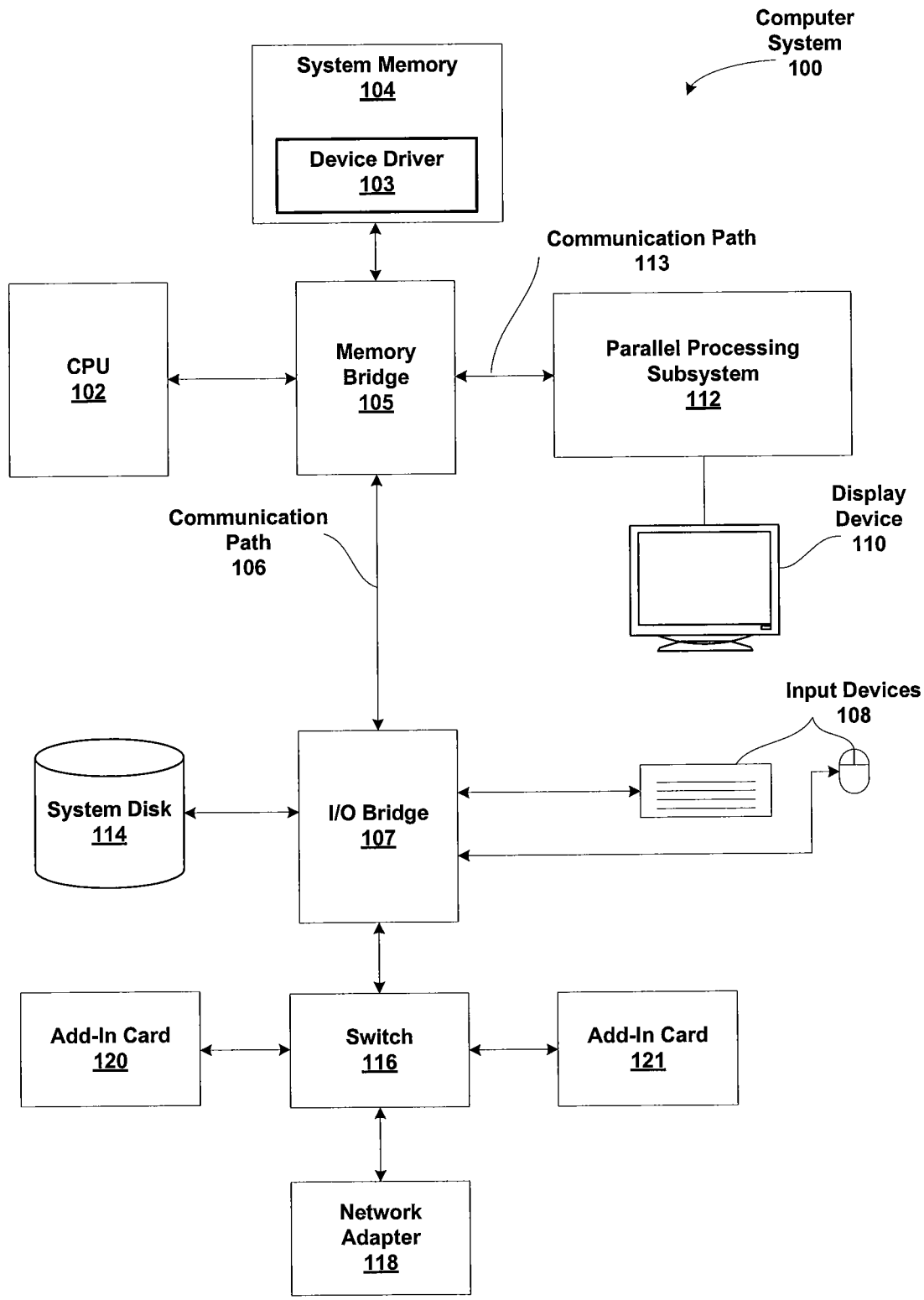
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
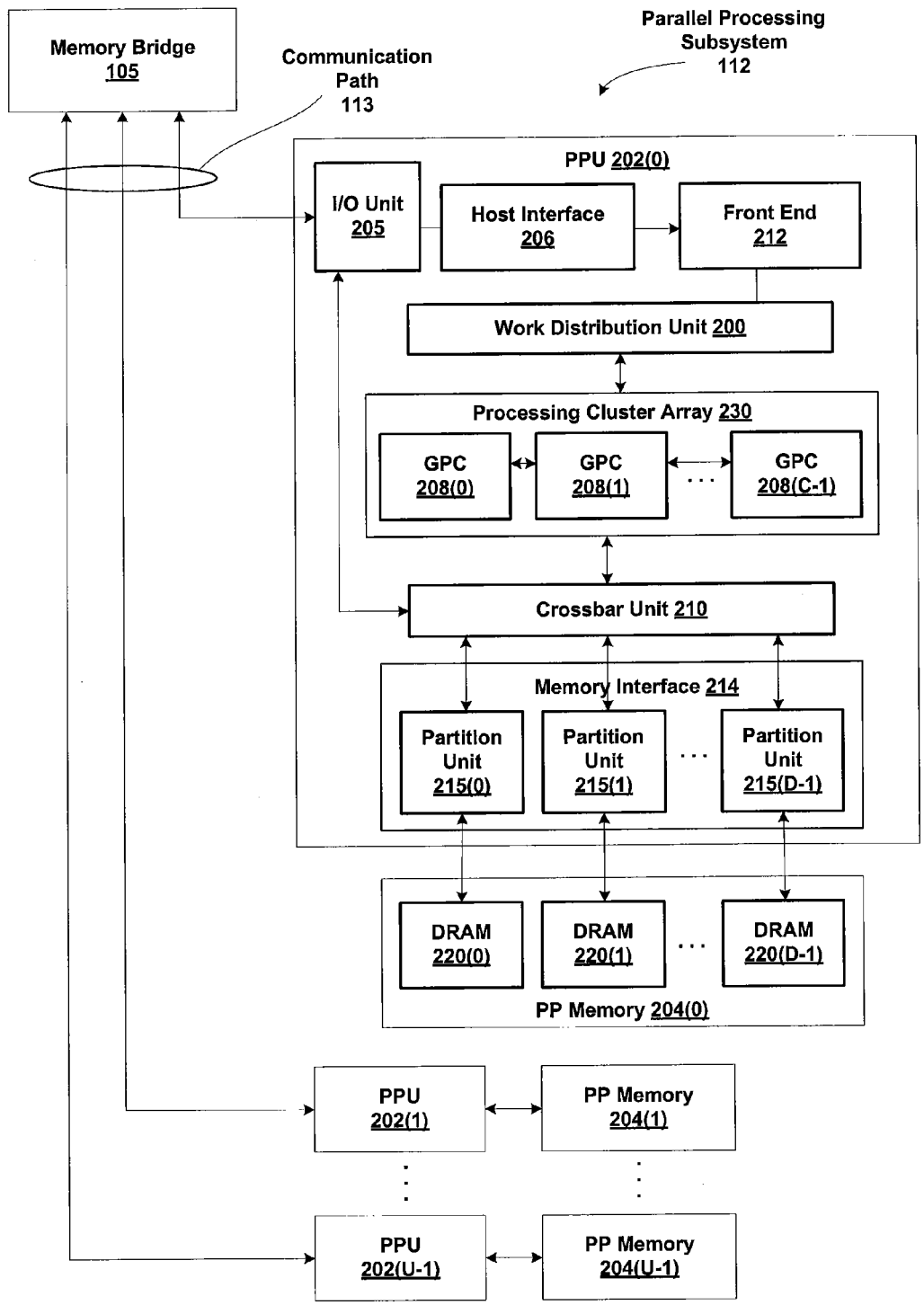
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the push buffer is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
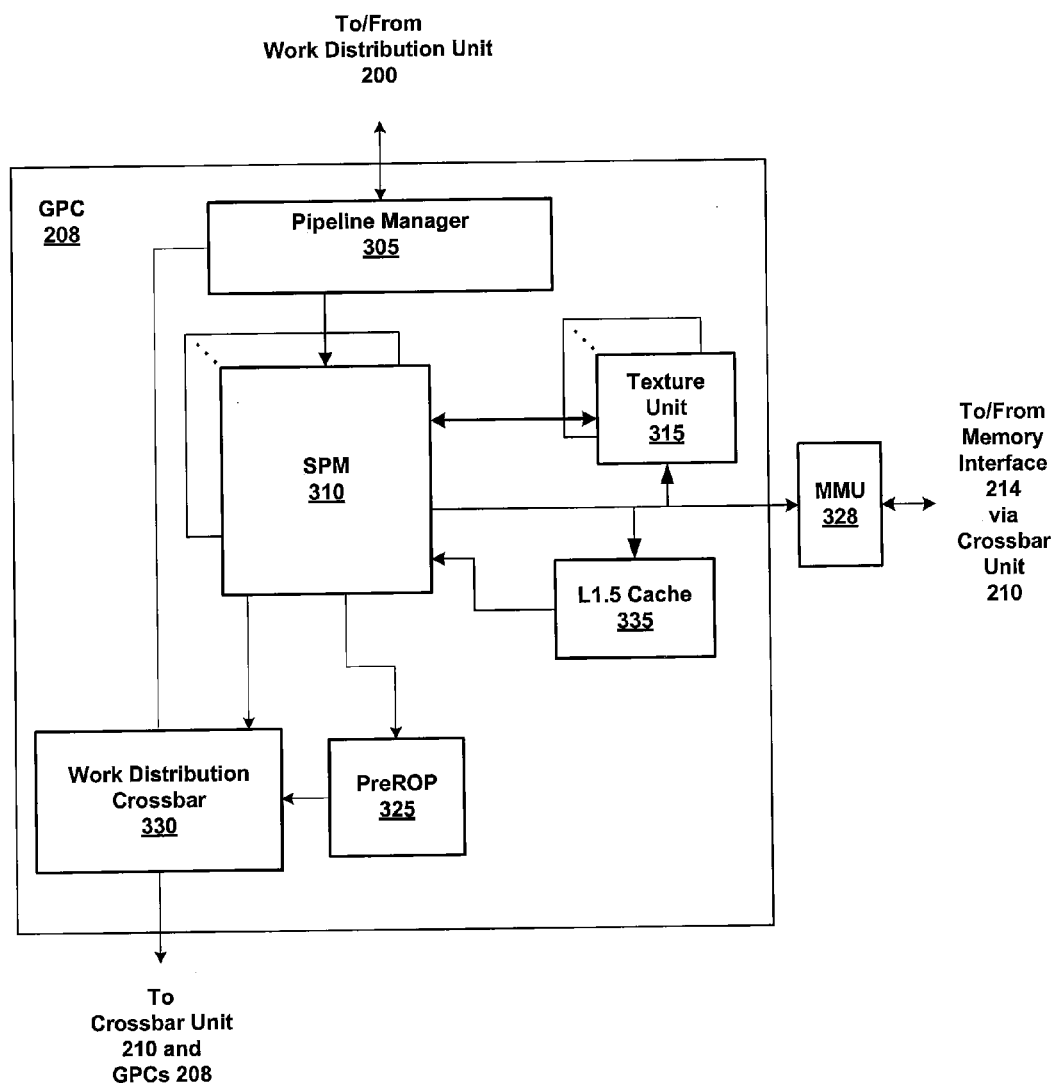
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
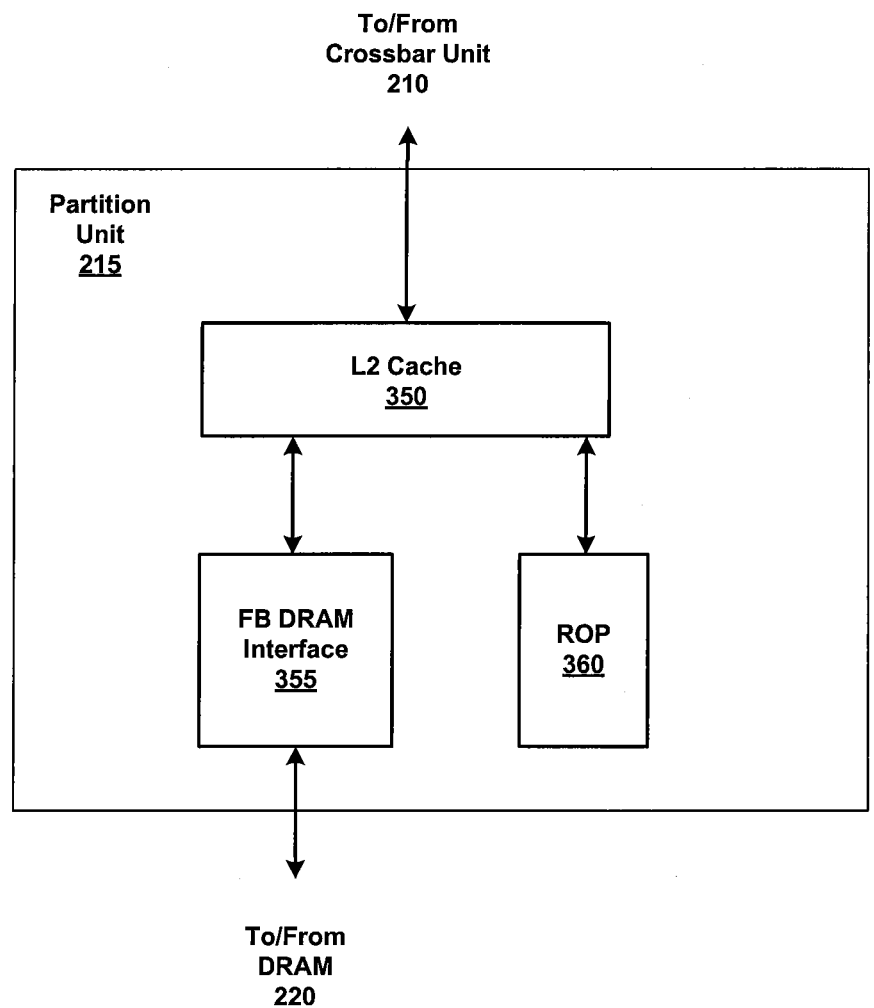
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
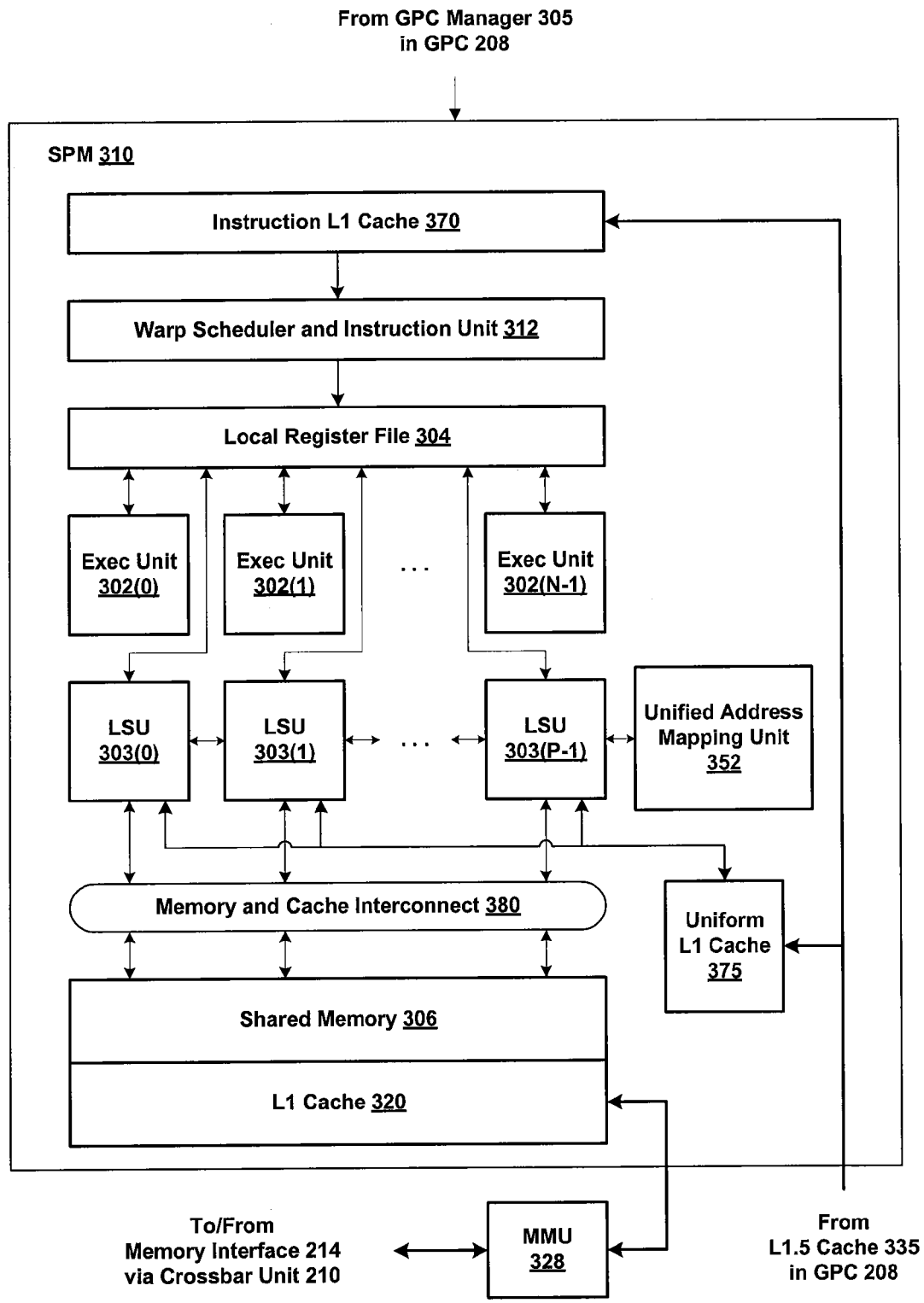
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
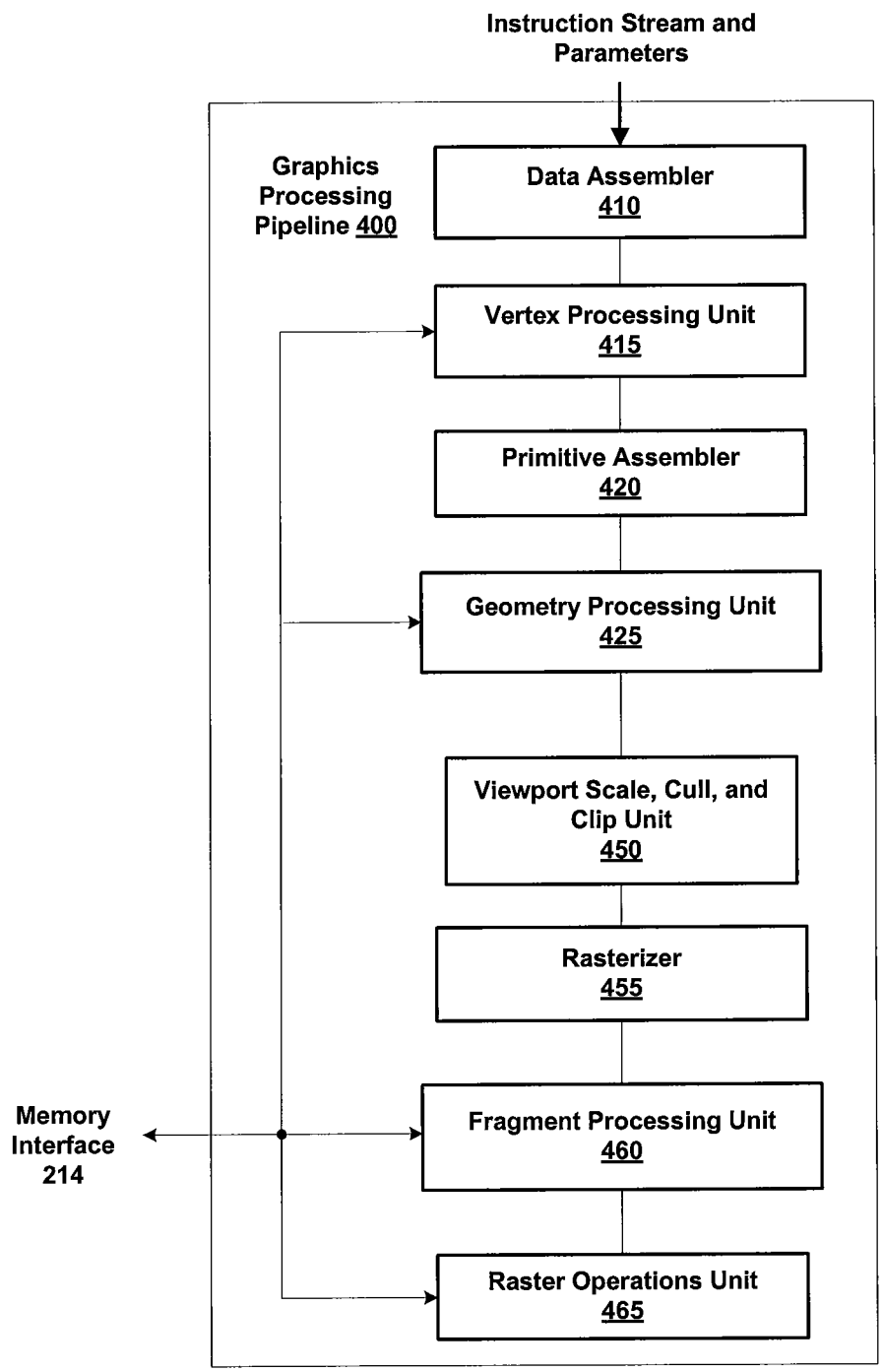
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Distributed Stream Output Overview

Figure 5:
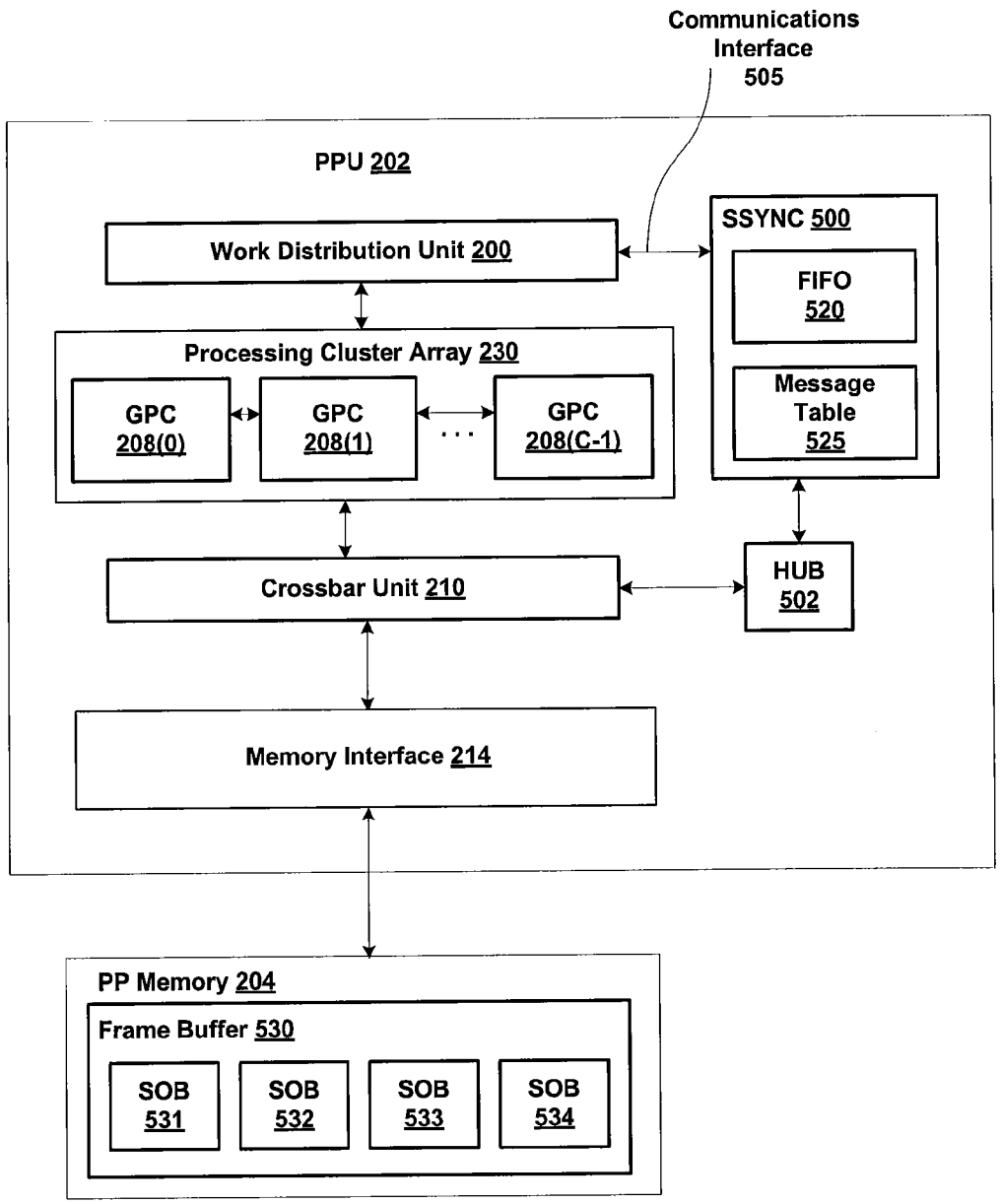
FIG. 5 is a block diagram of the parallel processing unit of FIG. 2 that implements stream output operations via one or more distributed stream output units, according to one embodiment of the present invention.

FIG. 5 is a block diagram of the parallel processing unit 202 of FIG. 2 that implements stream output operations via one or more distributed stream output units, according to one embodiment of the present invention. As shown, PPU 202 further includes a stream synchronization unit (SSYNC) 500 coupled to the work distribution unit 200 via a communications interface 505 and a hub 502 that enables communication between the SSYNC unit 500 and one or more distributed stream output units via the crossbar unit 210. Distributed stream output units, such as stream output unit 645 described below in conjunction with FIG. 6B, may be configured to write vertex attribute data to one or more stream output buffers 531, 532, 533 and 534 after vertex data or graphics primitives are processed in graphics processing pipeline 400.

In operation, work distribution unit 200 receives a sequence of packets from device driver 103 via the front end 212 and distributes the operations and data included in the packets to the one or more GPCs 208 for processing in graphics processing pipeline 400. The sequence of packets includes state bundles that configure the operation of PPU 202 as well as work packets that have microcode and pointers to graphics primitives that are processed by PPU 202.

Work distribution unit 200 bundles up to 32 vertices from a work packet into a batch for distribution to one of the GPCs 208 of PPU 202. Work distribution unit 200 also generates unique batch IDs and assigns them to each batch of vertices distributed to the GPCs 208. In one embodiment, batch IDs are generated consecutively from a 13-bit wrapping counter and a 1-bit phase that is stored in the most significant bit of the 14-bit batch ID. Work distribution unit 200 is responsible for ensuring that each batch ID assigned to a batch of vertices processed by PPU 202 is unique with respect to the other batches of vertices currently being processed in the graphics pipeline. Once a batch of vertices has been processed, the SSYNC unit 500 sends a batch ID retirement message to the work distribution unit 200 to indicate that a batch ID may be released and reused for a subsequent batch of vertices.

Work distribution unit 200 sends work tokens and stream enable and stream disable state bundles to SSYNC unit 500 via the communications interface 505. Each work token includes a batch ID that corresponds to a particular batch of vertices distributed by work distribution unit 200. Stream enable and stream disable bundles indicate to SSYNC unit 500 the start and end of a stream output operation. A stream output operation includes writing the processed vertex attribute data of all work packets received by the work distribution unit 200 between a stream enable state bundle and a stream disable state bundle to one or more stream output buffers defined by a graphics API.

For example, if work distribution unit 200 receives a sequence of packets in the following order—W W W E W W W D W W W E W W W W D W W W, where W depicts a work packet, E depicts a stream enable bundle, and D depicts a stream disable bundle, the work packets between the first stream enable bundle and the first stream disable bundle as well as the work packets between the second stream enable bundle and the second stream disable bundle would be processed and written to one or more stream output buffers 531, 532, 533 and 534 by PPU 202.

SSYNC unit 500 is configured to track all outstanding stream output operations using a FIFO 520 stored in dedicated static random access memory (SRAM) internal to SSYNC unit 500. In alternative embodiments, SSYNC unit 500 may store FIFO 520 in the parallel processing memory 204, L2 cache 350, or system memory 104. SSYNC unit 500 creates an entry in FIFO 520 for each stream output operation received from work distribution unit 200. A stream output operation entry stored in FIFO 520 by SSYNC unit 500 includes the batch ID assigned to the first work packet received after a stream enable state bundle and the batch ID assigned to the first work packet received after the immediately subsequent stream disable state bundle. Thus, SSYNC unit 500 may determine when a stream output operation begins and ends using the batch IDs included in the stream output operation entry.

Ideally, a graphics API would like to specify that stream output of vertex attribute data should be written to one or more stream output buffers in the same order that the vertices associated with the vertex attribute data are received by PPU 202 from the device driver 103. This ensures that the device driver 103 may correctly map the vertices passed as input to PPU 202 to the vertex attribute data written as output in the stream output buffers 531, 532, 533 and 534. SSYNC unit 500 is advantageously configured to synchronize the various distributed stream output units of PPU 202 such that the stream output buffers 531, 532, 533 and 534 are filled in a serialized manner to comply with this type of API requirement.

In one embodiment, stream output buffers 531, 532, 533 and 534 are stored in a frame buffer 530 in parallel processing memory 204. In alternative embodiments, stream output buffers 531, 532, 533 and 534 may be stored in system memory 104. SSYNC unit 500 maintains starting stream output buffer offsets (SSOBO) for each of the four stream output buffers 531, 532, 533 and 534. From one stream output operation to the next, vertex attribute data is appended to the stream output buffers 531, 532, 533 and 534 at the SSOBOs maintained by SSYNC unit 500. SSYNC unit 500 increments the SSOBOs by the amount of vertex attribute data written to each stream output buffer 531, 532, 533 and 534. SSYNC unit 500 may also adjust the SSOBOs in response to an offset state bundle received from the work distribution unit 200 between stream output operations. The offset state bundle includes a new SSOBO for each of the four stream output buffers 531, 532, 533 and 534.

A messaging protocol may be implemented between SSYNC unit 500 and the various distributed stream output units of PPU 202. In one embodiment, SSYNC unit 500 stores messages received from the various stream output units in a message table 525 stored in dedicated SRAM internal to SSYNC unit 500. In alternative embodiments, message table 525 may be stored in the parallel processing memory 204, L2 cache 350, or system memory 104. Because stream output units send messages serially (i.e. each stream output unit only sends one message at a time), message table 525 is sized to hold the same number of messages as there are stream output units in PPU 202. SSYNC unit 500 may be configured to set an outstanding message flag bit when there are outstanding messages in the message table 525.

Figure 6A:
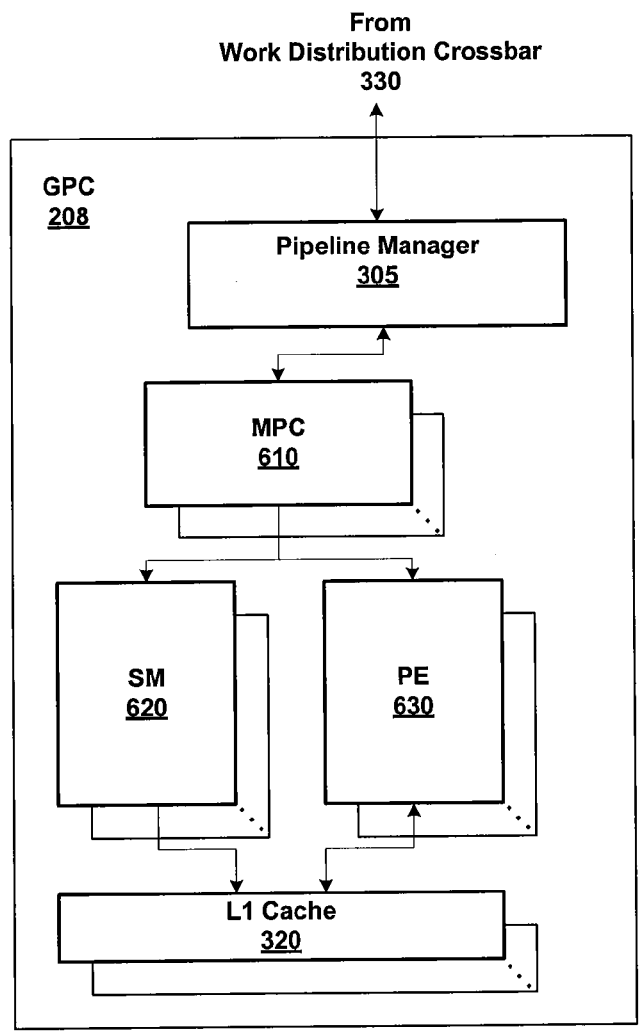
FIG. 6A is a block diagram of a GPC configured to perform stream output operations, according to one embodiment of the present invention.

FIG. 6A is a block diagram of a GPC 208 configured to perform stream output operations, according to one embodiment of the present invention. As shown, GPC 208 includes a pipeline manager 305 that distributes batches of vertices received from the work distribution unit 200 or work distribution crossbar 330 to one or more SPMs 310 in GPC 208. Each SPM 310 includes an Mpipe controller (MPC) 610, a shader module (SM) 620, a primitive engine (PE) 630, and an L1 cache 320. MPC 610 schedules shader programs on the SM 620 to process the batches of vertices received from pipeline manager 305. SM 620 includes 16 scalar shader programs, where each shader program executes two instructions per clock cycle. MPC 610 may also schedule operations on PE 630 such as viewport scaling, clipping, culling, stream output, and copy out operations as well as other fixed function per-primitive work.

Figure 6B:
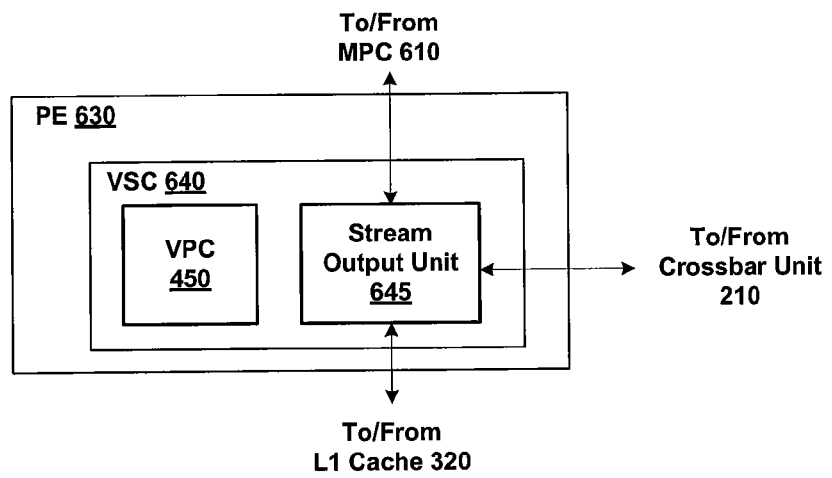
FIG. 6B is a block diagram of a portion of the primitive engine in the GPC of FIG. 6A, according to one embodiment of the present invention.

FIG. 6B is a block diagram of a portion of the primitive engine 630 in the GPC 208 of FIG. 6A, according to one embodiment of the present invention. As shown, primitive engine 630 includes a VSC unit (VPC/Stream Output/Copy Out) 640 for performing various fixed function per-primitive work. VSC unit 640 includes VPC (Viewport/Clip/Cull) unit 450 as well as stream output (SO) unit 645. SO unit 645 is configured to output vertex attribute data to one or more of the four stream output buffers 531, 532, 533 or 534. In one embodiment, SO unit 645 is configured to perform stream output operations after vertex attribute data is processed by geometry processing unit 425 in graphics pipeline 400. It will be appreciated that each SPM 310 in GPC 208 includes a separate and distinct SO unit 645.

As discussed above, SSYNC unit 500 synchronizes SO unit 645 with the one or more other stream output units in PPU 202 to fill the stream output buffers 531, 532, 533 and 534 in a serialized fashion. In order to synchronize the various stream output units in PPU 202, a messaging protocol is implemented between the different units of PPU 202. SSYNC unit 500 communicates with SO unit 645 over the crossbar unit 210.

Figure 7A:
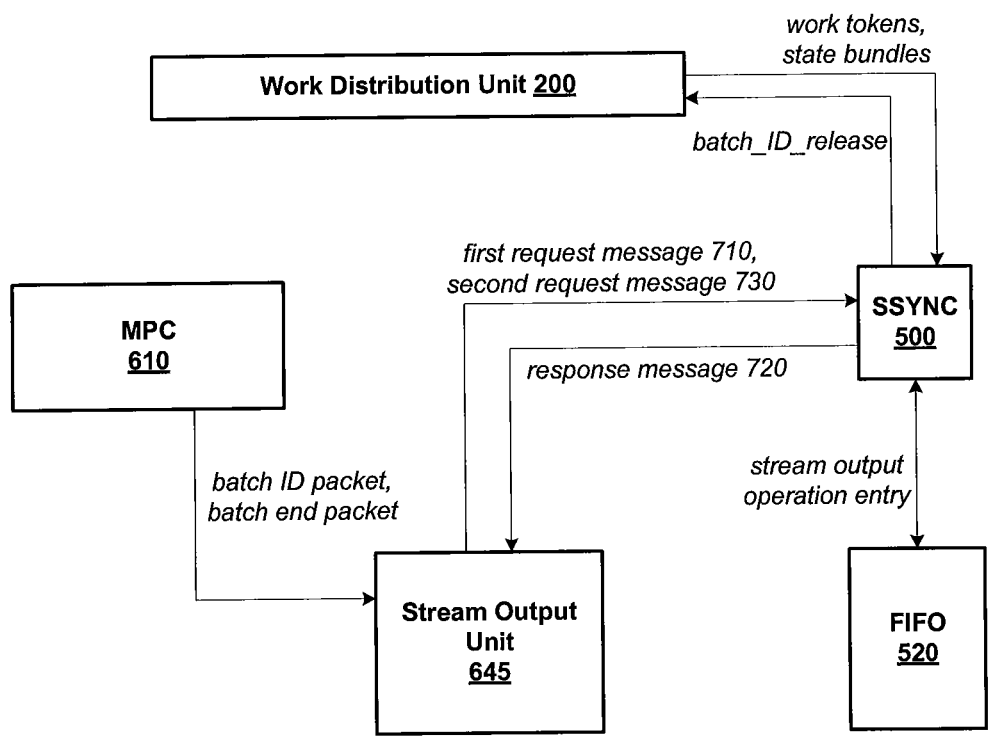
FIGS. 7A-7D illustrate a messaging protocol implemented by the PPU to synchronize stream output among a plurality of distributed stream output units, according to one embodiment of the present invention.

FIGS. 7A-7D illustrate a messaging protocol 700 implemented by the PPU 202 to synchronize stream output among a plurality of distributed stream output units, according to one embodiment of the present invention. FIG. 7A shows a conceptual diagram of a messaging protocol 700 implemented by the different units of PPU 202. A stream output operation is initiated by device driver 103 by issuing a sequence of work packets to PPU 202 in between a stream enable state bundle and a stream disable state bundle. As work distribution unit 200 receives the sequence of packets from front end 212, work distribution unit 200 sends work tokens and stream enable and stream disable state bundles to SSYNC unit 500 via the communications interface 505. For each pair of stream enable and stream disable state bundles received, SSYNC unit 500 creates a stream output operation entry in FIFO 520. For each work token received by SSYNC unit 500 that is included in a stream output operation, SSYNC unit 500 expects to receive a message from one of the SO units 645 in PPU 202 requesting to write vertex attribute data to the stream output buffers 531, 532, 533 and 534 for the batch of vertices associated with the batch ID included in that particular work token.

When MPC unit 610 schedules a batch of vertices for processing on SM 620 or PE 630 and stream output is enabled, i.e. the batch ID associated with the batch of vertices is part of an outstanding stream output operation, MPC unit 610 sends a batch ID packet to SO unit 645. The batch ID packet includes the batch ID associated with the batch of vertices scheduled on the SM 620 or PE 630. When SO unit 645 receives the batch ID packet from MPC unit 610, SO unit 645 sends a first request message 710, described below in conjunction with FIG. 7B, to SSYNC unit 500.

In response to receiving the first request message 710, and if SSYNC unit 500 is not currently processing a stream output operation, SSYNC unit 500 fetches the next stream output operation entry from FIFO 520. SSYNC unit 500 sets the current batch ID to the first batch ID associated with the stream output operation entry fetched from FIFO 520. SSYNC unit 500 determines whether the current batch ID is equal to the batch ID included in the first request message 710. If SSYNC unit 500 determines that the current batch ID matches the batch ID in the first request message 710, then SSYNC unit 500 sends a response message 720, described below in conjunction with FIG. 7C, to SO unit 645. Response message 720 includes the SSOBO for each of the four stream output buffers 531, 532, 533 and 534 that indicates to SO unit 645 where to write the processed vertex attribute data for the batch of vertices associated with the batch ID included in the first request message 710.

If SSYNC unit 500 determines that the current batch ID does not match the batch ID included in the first request message 710, then SSYNC unit 500 waits to send the response message 720 to SO unit 645 until the current batch ID matches the batch ID included in the first request message 710. As the other stream output units in PPU 202 write vertex attribute data for batches of vertices associated with the current batch ID to the stream output buffers 531, 532, 533 and 534, SSYNC unit 500 increments the current batch ID such that when all prior issued batches of vertices have been written, the current batch ID matches the batch ID included in the first request message 710. If SSYNC unit 500 determines that the current batch ID does not match the batch ID included in the first request message 710, then SSYNC 500 may be configured to store the first request message 710 in message table 525 and set an outstanding message flag bit. If the outstanding message flag bit is set, every time SSYNC unit 500 increments the current batch ID, SSYNC unit 500 compares the current batch ID to the batch IDs included in all messages stored in message table 525 to determine whether one of the various SO units 645 of PPU 202 is currently waiting to write vertex attribute data associated with the current batch ID to the stream output buffers 531, 532, 533 and 534.

When SM 620 or PE 630 has finished processing the batch of vertices, MPC 610 sends a batch end packet to SO unit 645. SO unit 645 computes how much data SO unit 645 needs to write to each of the four stream output buffers by looking at the amount of vertex attribute data written to the L1 cache 320. SO unit 645 then sends SSYNC unit 500 a second request message 730, described below in conjunction with FIG. 7D, that includes the number of bytes SO unit 645 needs to write to each of the four stream output buffers 531, 532, 533 and 534. SO unit 645 may then fill the stream output buffers 531, 532, 533 and 534 with the processed vertex attribute data. It will be appreciated that the order of the response message 720 and the second request message 730 may be reversed such that SSYNC unit 500 receives both the first request message 710 and second request message 730 from SO unit 645 before SSYNC unit 500 sends the response message 720 to SO unit 645.

After SSYNC unit 500 receives the second request message 730 from SO unit 645, SSYNC unit 500 increases the SSOBO for each of the four stream output buffers 531, 532, 533 and 534 by the number of bytes needed that is included in the second request message 730. SSYNC unit 500 then increments the current batch ID and waits for a new first request message 710 that includes the current batch ID.

In one embodiment, graphics processing pipeline 400 includes shader programs, such as a tessellation shader or a geometry shader, that emit one or more vertices for each vertex received by the shader programs as input. In such cases, graphics processing pipeline 400 may be configured to split a batch of vertices associated with a unique batch ID into two or more batches of vertices associated with that same batch ID. In order to maintain ordered stream output when a batch of vertices associated with a unique batch ID is split into two or more batches of vertices, graphics processing pipeline 400 may be configured to associate the original batch ID as well as a unique task number and a last task bit with each of the two or more batches of vertices generated by the shader program. The task number is set to zero (0) for the first batch of vertices generated from the original batch of vertices. For each additional batch of vertices generated from the original batch of vertices, the task number is incremented by one. The last task bit is set for the last batch of vertices generated from the original batch of vertices.

When a shader program generates multiple batches of vertices associated with the same batch ID, SSYNC unit 500 may be configured to ensure that batches associated with the same batch ID are also processed in order according to the task number. Certain operational aspects of SSYNC unit 500 and SO unit 645 described above are adjusted to incorporate functionality the enables SSYNC unit 500 to synchronize stream output of multiple batches of vertices associated with the same batch ID. For example, SSYNC unit 500 checks the current batch ID and current task number of the outstanding stream output operation against the batch ID and task number included in the first request message 710. When the current batch ID is incremented by SSYNC unit 500, the current task number is also set to zero (0). The first request message 710 includes the batch ID, the task number, and the last task bit associated with the batch of vertices waiting to be output by SO unit 645. SSYNC unit 500 then compares both the current batch ID and current task number to the batch ID and task number included in the first request message 710.

In addition, SSYNC unit 500 only increments the current batch ID if all batches of vertices associated with the current batch ID have been written to stream output. In response to receiving the second request message 730 and after increasing the SSOBO for each of the four stream output buffers 531, 532, 533 and 534, SSYNC unit 500 adjusts the current batch ID or current task number accordingly based on whether the last task bit is set. If the last task bit is not set (indicating that there are additional batches of vertices associated with the current batch ID that have not been written to stream output), SSYNC unit 500 increments the current task number after receiving the second request message 730. In contrast, if the last task bit is set (indicating that all batches of vertices associated with the current batch ID have been written to stream output), SSYNC unit 500 increments the current batch ID and resets the current task number to zero (0). In this manner, SSYNC unit 500 processes each batch of vertices associated with the same batch ID in order according to the task number before moving on to the next batch ID included in the stream output operation.

Figure 7B:
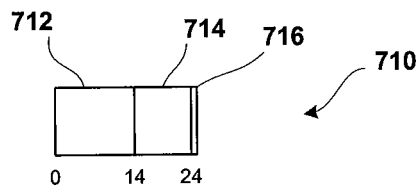

As shown in FIG. 7B, the first request message 710 is 25 bits long and includes the batch ID 712, task number 714, and last task bit 716. The batch ID 712 is a 14-bit value that holds the batch ID associated with the batch of vertices waiting to be written by SO unit 645 to the stream output buffers 531, 532, 533 and 534. The task number 714 is a 10 bit value that holds the task number associated with the batch of vertices waiting to be written by the SO unit 645. The last task bit 716 is a 1-bit value that indicates whether the batch of vertices waiting to be written by the SO unit 645 is the last batch of vertices associated with the batch ID 712.

In alternative embodiments, where the graphics pipeline 400 is not configured to split batches of vertices into two or more batches of vertices, the first request message 710 may include the task number and last task bit as dummy bits always set to 0. In yet other embodiments, the first request message 710 may only include the 14-bit batch ID.

Figure 7C:
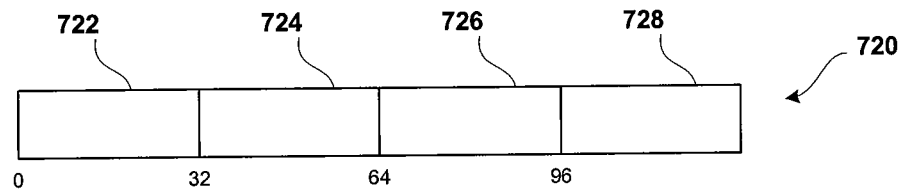
Figure 7D:
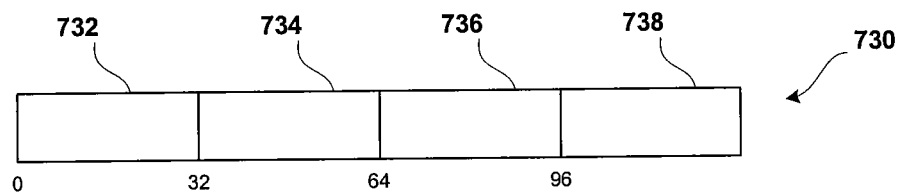

As shown in FIG. 7C, the response message 720 is 128 bits long. SSOBOs 722, 724, 726, and 728 are the byte offsets into the four stream output buffers 531, 532, 533 and 534 at which SO unit 645 may start writing processed vertex attribute data. As shown in FIG. 7D, the second request message 730 is 128 bits long. Stream buffer bytes needed (SBBN) 732, 734, 736, and 738 are the number of bytes that SO unit 645 needs to write to each of the four stream output buffers 531, 532, 533 and 534.

Figure 8:
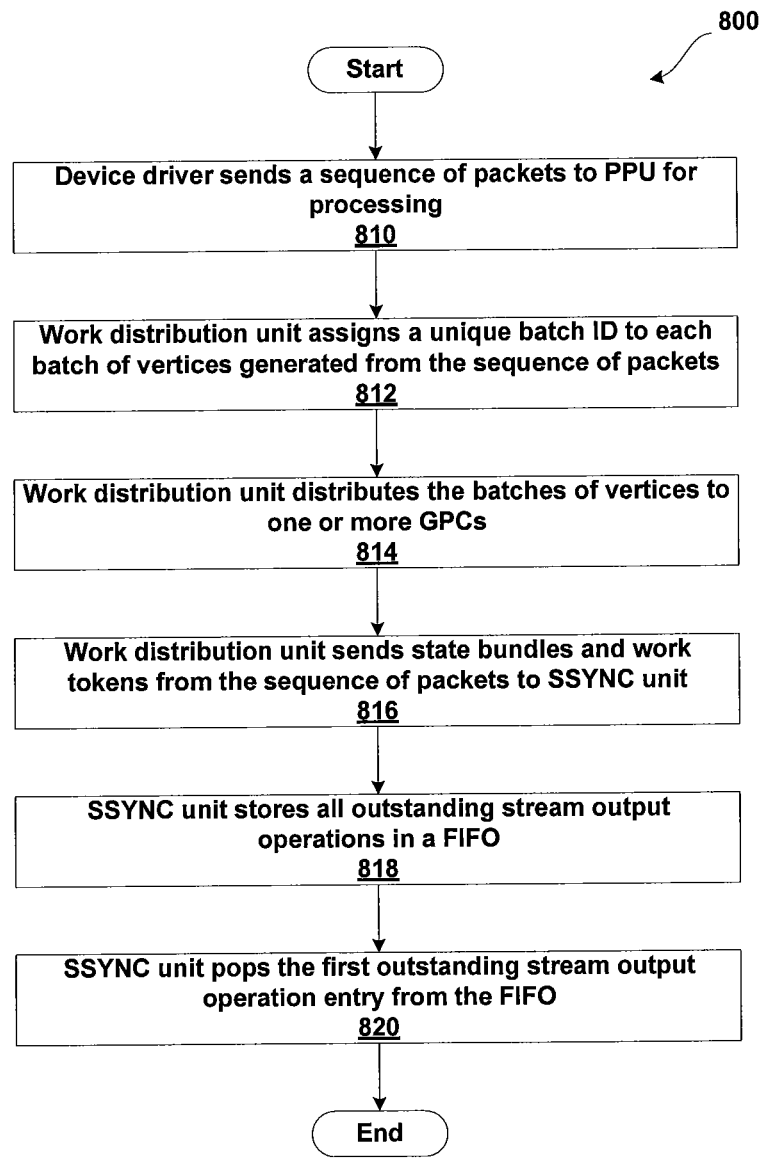
FIG. 8 sets forth a flowchart of a method for assigning unique batch IDs to batches of vertices distributed to a plurality of stream output units, according to one embodiment of the present invention.

FIG. 8 sets forth a flowchart of a method 800 for assigning unique batch IDs to batches of vertices distributed to a plurality of stream output units 645, according to one embodiment of the present invention. Although the method steps are described in conjunction with the systems of FIGS. 1, 2, 3A-3C, 4, 5, 6A-6B and 7A-7D, persons skilled in the art will understand that any system configured to perform the method steps, in any order, is within the scope of the invention.

As shown, method 800 begins at step 810, where device driver 103 sends a sequence of packets to PPU 202 for processing. In one embodiment, device driver 103 writes packets to a push buffer (not shown) stored in system memory 104 that may be read by PPU 202. I/O unit 205, host interface 206 and front end 212 fetch the packets from the push buffer and send the packets to the work distribution unit 200. At step 812, work distribution unit 200 assigns a unique batch ID to each batch of up to 32 vertices received from device driver 103. At step 814, work distribution unit 200 distributes the batches of vertices for processing by the one or more GPCs 208 in PPU 202. In one embodiment, each GPC 208 in PPU 202 may be configured to implement one functional unit of graphics pipeline 400. In alternative embodiments, a GPC 208 may be configured to implement more than one functional unit of graphics pipeline 400.

At step 816, work distribution unit 200 sends state bundles and work tokens associated with the work packets to SSYNC unit 500. SSYNC unit 500 is responsible for tracking all outstanding stream output operations and ensuring that the distributed SO units 645 write processed vertex attribute data to the stream output buffers 531, 532, 533 and 534 in the correct order. At step 818, SSYNC unit 500 stores all outstanding stream output operations in a FIFO 520. For each pair of stream enable and stream disable state bundles received by SSYNC unit 500, SSYNC unit 500 pushes a stream output operation entry to FIFO 520 that includes the batch ID associated with the first work token received after the stream enable bundle and the batch ID associated with the first work token received after the stream disable bundle.

At step 820, SSYNC unit 500 pops the next outstanding stream output operation entry from FIFO 520. SSYNC unit 500 then waits to receive a first request message 710 from one of the SO units 645 that includes a batch ID that matches the first batch ID from the stream output operation entry.

It will be appreciated that method 800 enables a single SSYNC unit 500 to track the order of a plurality of batches of vertices distributed to different SO units 645 in PPU 202. A protocol for synchronizing distributed stream output operations using the batch IDs associated with the plurality of batches of vertices is described below in conjunction with FIGS. 9A-9C.

Figure 9A:
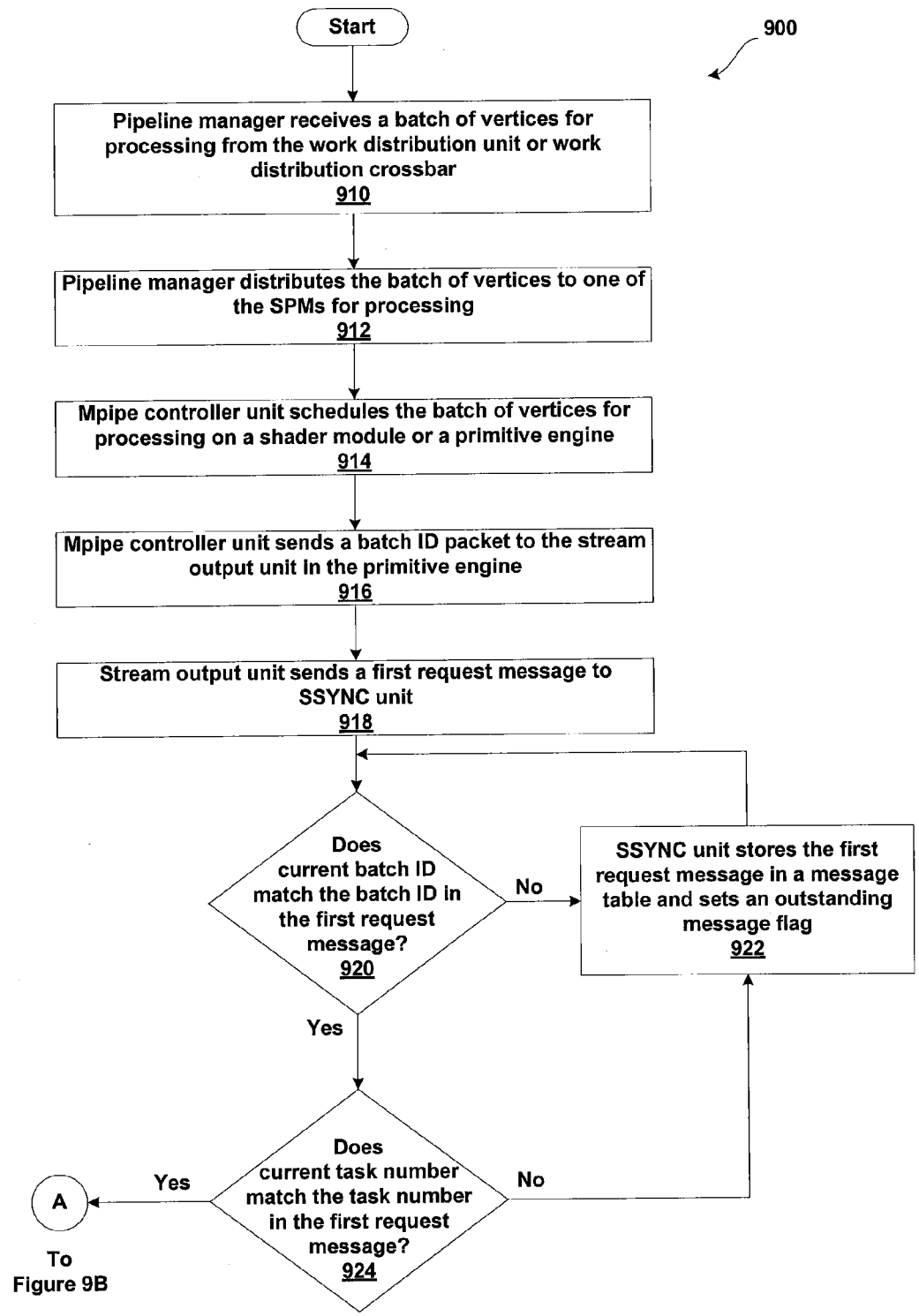
FIGS. 9A-9C set forth a flowchart of a method for implementing a protocol for synchronizing distributed stream output operations, according to one embodiment of the present invention.
Figure 9B:
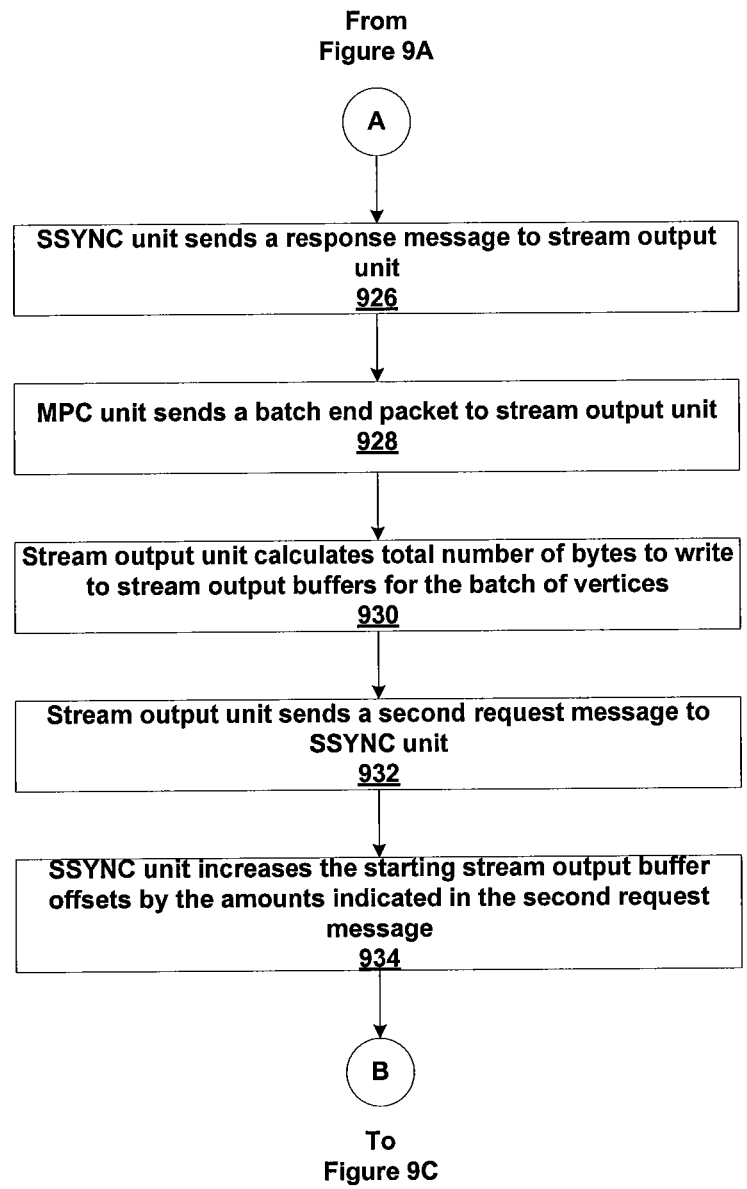
Figure 9C:
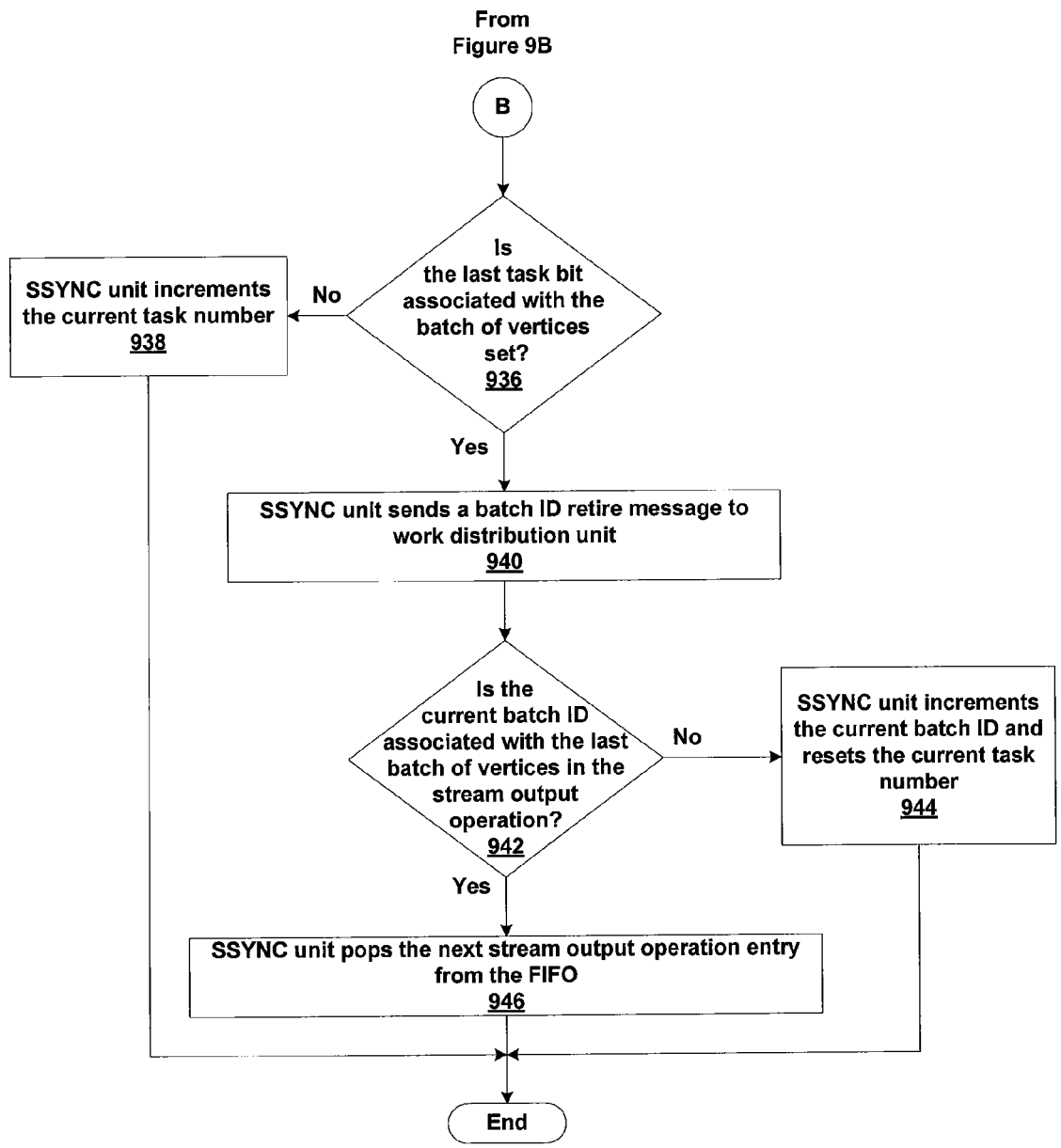

FIGS. 9A-9C set forth a flowchart of a method 900 for implementing a protocol for synchronizing distributed stream output operations, according to one embodiment of the present invention. Although the method steps are described in conjunction with the systems of FIGS. 1, 2, 3A-3C, 4, 5, 6A-6B and 7A-7D, persons skilled in the art will understand that any system configured to perform the method steps is within the scope of the invention.

As shown, the method 900 begins at step 910, where pipeline manager 305 of GPC 208 receives a batch of vertices for processing from the work distribution unit 200 or work distribution crossbar 330. The batch of vertices is associated with a batch ID assigned by work distribution unit 200. In addition, in the case where the original batch of vertices has been split into multiple batches of vertices by a shader program, the batch of vertices may also be associated with a task number and a last task bit. At step 912, pipeline manager 305 distributes the batch of vertices to one of the SPMs 310 of GPC 208. SPM 310 implements one or more of the functional units in graphics processing pipeline 400. SPM 310 is configured with SM 620 and primitive engine 630 that includes a distributed SO unit 645. At step 914, MPC unit 610 schedules the batch of vertices for processing on SM 620 or PE 630. At step 916, MPC unit 610 sends a batch ID packet to SO unit 645 in PE 630.

At step 918, when SO unit 645 receives a batch ID packet from MPC unit 610 and stream output is enabled, SO unit 645 sends a first request message 710 to SSYNC unit 500. The first request message 710 communicates to SSYNC unit 500 that the batch of vertices associated with the batch ID included in the first request message 710 is ready to be written to the stream output buffers 531, 532, 533 and 534 by SO unit 645. At step 920, SSYNC unit 500 determines whether the current batch ID matches the batch ID included in the first request message 710. If the current batch ID does not match the batch ID included in the first request message 710, then the method 900 proceeds to step 922 where SSYNC unit 500 stores the first request message 710 in message table 525 and sets an outstanding message flag bit. Then, SSYNC unit 500 waits until the current batch ID matches the batch ID included in the first request message 710. As SSYNC unit 500 receives other first request messages 710 from other SO units 645 that include a batch ID that matches the current batch ID, SSYNC unit 500 allocates space in the stream output buffers 531, 532, 533 and 534 for the other SO units 645 to perform stream output operations and increments the current batch ID. When all prior issued batches of vertices have requested space in the stream output buffers 531, 532, 533 and 534 from the SSYNC unit 500 such that the current batch ID matches the batch ID included in the first request message 710 stored in message table 525, method 900 proceeds to step 924.

At step 924, SSYNC unit 500 determines whether the current task number matches the task number included in the first request message 710. If the current task number does not match the task number included in the first request message 710, then the method 900 proceeds to step 922, described above. SSYNC unit 500 then waits until the current batch ID and current task number match the batch ID and task number included in the first request message 710. If, at step 924, the current task number matches the task number included in the first request message 710, then method 900 proceeds to step 926. It will be appreciated that step 924 may be skipped when graphics pipeline 400 is not configured to split batches of vertices into multiple batches of vertices associated with the same batch ID. In such cases, method 900 may proceed directly to step 926 if the current batch ID matches the batch ID included in the first request message 710.

At step 926, SSYNC unit 500 sends a response message 720 to SO unit 645. The response message 720 includes the SSOBOs for each of the four stream output buffers 531, 532, 533 and 534. In this fashion, SSYNC unit 500 allocates memory in the stream output buffers 531, 532, 533 and 534 so that SO unit 645 may write vertex attribute data to the stream output buffers 531, 532, 533 and 534 for the batch of vertices distributed to SO unit 645. At step 928, MPC unit 610 sends a batch end packet to SO unit 645 that indicates that SM 620 or PE 630 is finished processing the batch of vertices. At step 930, in response to receiving the batch end packet, SO unit 645 calculates the total number of bytes needed to write vertex attribute data for the current batch of vertices to the stream output buffers 531, 532, 533 and 534. In one embodiment, SO unit 645 computes the total number of bytes written to the L1 cache 320 by SM 620 or PE 630 for the batch of vertices to determine how many bytes need to be written to the stream output buffers 531, 532, 533 and 534. In alternative embodiments, SO unit 645 may determine how many bytes need to be written to the stream output buffers 531, 532, 533 and 534 in any technically feasible manner, such as by receiving a message from MPC unit 610 of how many bytes were written to the L1 cache 320.

At step 932, SO unit 645 sends a second request message 730 to SSYNC unit 500. The second request message 730 includes the total number of bytes needed to be written to the stream output buffers 531, 532, 533 and 534 by SO unit 645. At step 934, SSYNC unit 500 increases the SSOBOs by the amounts indicated in the second request message 730. In this manner, SSYNC unit 500 allocates memory in the stream output buffers 531, 532, 533 and 534 for all vertex attribute data needed to be written by SO unit 645.

At step 936, SSYNC unit 500 determines whether the last task bit associated with the current batch of vertices distributed to SO unit 645 is set. If the last task bit is not set, then method 900 proceeds to step 938 where SSYNC unit 500 increments the current task number and process 900 terminates. If the last task bit is set, then SSYNC unit 500 resets the current task number to zero (0) and method 900 proceeds to step 940. It will be appreciated that steps 936 and 938 may be skipped when graphics pipeline 400 is not configured to split batches of vertices into multiple batches of vertices associated with the same batch ID. In such cases, method 900 may proceed directly to step 940.

At step 940, SSYNC unit 500 sends a batch ID retire message to work distribution unit 200. The batch ID retire message releases the batch ID to be reused by work distribution unit 200 for subsequent batches of vertices distributed to graphics processing pipeline 400. At step 942, SSYNC unit 500 determines whether the current batch of vertices is the last batch of vertices in the current stream output operation. If the current batch of vertices is not the last batch of vertices in the current stream output operation, then method 900 proceeds to step 944 where SSYNC unit 500 increments the current batch ID, resets the current task number to zero, and method 900 terminates.

Returning now to step 942, if the current batch of vertices is the last batch of vertices in the current stream output operation, then method 900 proceeds to step 946 where SSYNC unit 500 pops the next outstanding stream output operation entry from FIFO 520 and method 900 terminates.

It will be appreciated that method 900 describes the steps for synchronizing the stream output operation with respect to a single outstanding batch of vertices in one of the SPM units 310 of GPC 208. The steps described in method 900 may be repeated for each outstanding batch of vertices included in an outstanding stream output operation distributed within PPU 202 by the work distribution unit 200.

In sum, the technique used for distributed stream output disclosed above provides a more efficient way to perform stream output operations in a parallel processing system. More specifically, a stream synchronization unit is provided that enables the parallel processing unit to track one or more batches of vertices being processed in a graphics processing pipeline. A plurality of stream output units is also provided, where each stream output unit writes vertex attribute data to one or more stream output buffers for a portion of the batches of vertices. A messaging protocol is implemented between the stream synchronization unit and the plurality of stream output units that ensures that each of the stream output units writes vertex attribute data for the particular batch of vertices distributed to that particular stream output unit in the same order in the stream output buffers as the order in which the batch of vertices was received from a device driver by the parallel processing unit.

One advantage of the disclosed approach is that the distributed stream output units are able to fully saturate the available frame buffer bandwidth. Multiple, distributed stream output units may write data to the frame buffer during the same clock cycle. Therefore, even though each individual stream output unit may have a narrow bandwidth, the total stream output bandwidth is scalable to match the available frame buffer bandwidth. A further advantage of the disclosed method is that each stream output unit may write data to the frame buffer in parallel without waiting for the frame buffer to be filled by all prior issued work bundles. Therefore, the bottleneck created when using a single stream output unit for multiple, parallel shader programs is reduced.

While the foregoing is directed to embodiments of the present invention, other and further embodiments of the invention may be devised without departing from the basic scope thereof, and the scope thereof is determined by the claims that follow.

What is claimed is:

1. A computer-implemented method for controlling distributed stream output operations in a parallel processing unit, the method comprising:
   receiving a request message from a first stream output unit that includes a current batch identification number corresponding to a batch of vertices being processed within the parallel processing unit;
   determining whether the current batch identification number is equal to a batch identification number corresponding to a next batch of vertices being processed within the parallel processing unit that is to be written to one or more stream output buffers; and
   if the current batch identification number is equal to the batch identification number, then sending a response message that includes one or more stream output buffer offsets, wherein each stream output buffer offset indicates a location in a different one of the one or more stream output buffers where data is to be written, or
   if the current batch identification number is not equal to the batch identification number, then waiting for a request message from a different stream output unit.

2. The method of claim 1, further comprising:
   receiving a second request message from the first stream output unit that includes one or more values, wherein each value corresponds to a different stream output buffer and indicates a number of bytes to be written to the corresponding stream output buffer; and
   for each of the one or more values, incrementing by an amount equal to the value the stream output buffer offset associated with the stream output buffer corresponding to the value.

3. The method of claim 2, wherein the second request message is received after the response message has been sent.

4. The method of claim 1, wherein the batch of vertices is one batch of vertices in a plurality of batches of vertices generated from an original batch of vertices being processed within the parallel processing unit, and a batch identification number corresponding to the original batch of vertices also corresponds to each batch of vertices in the plurality of batches of vertices, the request message further including:
   a task number corresponding to the batch of vertices and indicating an order in which the batch of vertices was generated from the original batch of vertices relative to the other batches of vertices in the plurality of batches of vertices; and
   a last task bit corresponding to the batch of vertices and indicating whether the batch of vertices is a last batch of vertices generated from the original batch of vertices.

5. The method of claim 1, wherein the request message is transmitted by the first stream output unit, and the response message is transmitted to the first stream output unit via a crossbar unit.

6. The method of claim 1, wherein the step of waiting comprises storing the request message from the first stream output unit in a table.

7. The method of claim 6, wherein the step of waiting further comprises setting an outstanding message flag bit that indicates that the table includes the request message received from the first stream output unit.

8. The method of claim 1, further comprising:
   receiving a stream of packets from a work distribution unit that includes one or more stream enable bundles, one or more stream disable bundles, and a plurality of work tokens, wherein each work token in the plurality of work tokens includes a different batch identification number corresponding to a batch of vertices being processed within the parallel processing unit;
   generating a stream output operation entry in a FIFO that includes a starting batch identification number equal to the batch identification number included in the first work token received in the stream of packets after a first stream enable bundle and an ending batch identification number equal to the batch identification number included in the first work token received in the stream of packets after a first stream disable bundle, wherein the first stream disable bundle is the next subsequent stream disable bundle in the stream of packets received after the first stream enable bundle; and
   popping the stream output operation entry from the FIFO, wherein the starting batch identification number corresponds to the next batch of vertices to be written to one or more stream output buffers.

9. A system for controlling distributed stream output operations in a parallel processing unit, the system comprising:
   a plurality of stream output units, wherein each of the stream output units in the plurality of stream output units is configured to write data to one or more stream output buffers; and
   a stream synchronization unit coupled to each of the stream output units in the plurality of stream output units and configured to:
      receive a request message from a first stream output unit that includes a current batch identification number corresponding to a batch of vertices being processed within the parallel processing unit,
      determine whether the current batch identification number is equal to a batch identification number corresponding to a next batch of vertices being processed within the parallel processing unit that is to be written to one or more stream output buffers, and
      if the current batch identification number is equal to the batch identification number, then send a response message that includes one or more stream output buffer offsets, wherein each stream output buffer offset indicates a location in a different one of the one or more stream output buffers where data is to be written, or if the current batch identification number is not equal to the batch identification number, then wait for a request message from a different stream output unit.

10. The system of claim 9, the stream synchronization unit further configured to:
   receive a second request message from the first stream output unit that includes one or more values, wherein each value corresponds to a different stream output buffer and indicates a number of bytes to be written to the corresponding stream output buffer; and
   for each of the one or more values, increment by an amount equal to the value the stream output buffer offset associated with the stream output buffer corresponding to the value.

11. The system of claim 10, wherein the second request message is received after the response message has been sent.

12. The system of claim 9, wherein the batch of vertices is one batch of vertices in a plurality of batches of vertices generated from an original batch of vertices being processed within the parallel processing unit, and a batch identification number corresponding to the original batch of vertices also corresponds to each batch of vertices in the plurality of batches of vertices, the request message further including:
   a task number corresponding to the batch of vertices and indicating an order in which the batch of vertices was generated from the original batch of vertices relative to the other batches of vertices in the plurality of batches of vertices; and
   a last task bit corresponding to the batch of vertices and indicating whether the batch of vertices is a last batch of vertices generated from the original batch of vertices.

13. The system of claim 9, wherein the request message is transmitted by the first stream output unit, and the response message is transmitted to the first stream output unit via a crossbar unit.

14. The system of claim 9, further comprising:
   a memory coupled to the stream synchronization unit; and
   a table stored in the memory, wherein the request message from the first stream output unit is stored in the table if the current batch identification number is not equal to the batch identification number.

15. The system of claim 14, further comprising:
   an outstanding message flag bit that indicates that the table includes the request message received from the first stream output unit.

16. The system of claim 9, further comprising:
   a memory coupled to the stream synchronization unit;
   a FIFO stored in the memory; and
   a work distribution unit that is configured to send a stream of packets to the stream synchronization unit that includes one or more stream enable bundles, one or more stream disable bundles, and a plurality of work tokens, wherein each work token in the plurality of work tokens includes a different batch identification number corresponding to a batch of vertices being processed within the parallel processing unit.

17. The system of claim 16, wherein the stream synchronization unit is further configured to:
   generate a stream output operation entry in the FIFO that includes a starting batch identification number equal to the batch identification number included in the first work token received in the stream of packets after a first stream enable bundle and an ending batch identification number equal to the batch identification number included in the first work token received in the stream of packets after a first stream disable bundle, wherein the first stream disable bundle is the next subsequent stream disable bundle in the stream of packets received after the first stream enable bundle; and
   pop the stream output operation entry from the FIFO, wherein the starting batch identification number corresponds to the next batch of vertices to be written to one or more stream output buffers.

18. The system of claim 9, further comprising:
   a system memory;
   a central processing unit (CPU) coupled to the parallel processing unit;
   a device driver executed by the CPU and configured to control the operation of the parallel processing unit.

19. The system of claim 18, wherein the parallel processing unit is configured to implement a parallel pipeline architecture.

20. The system of claim 19, wherein the parallel processing unit is a programmable graphics processing unit.

* * * * *